Figure 1:
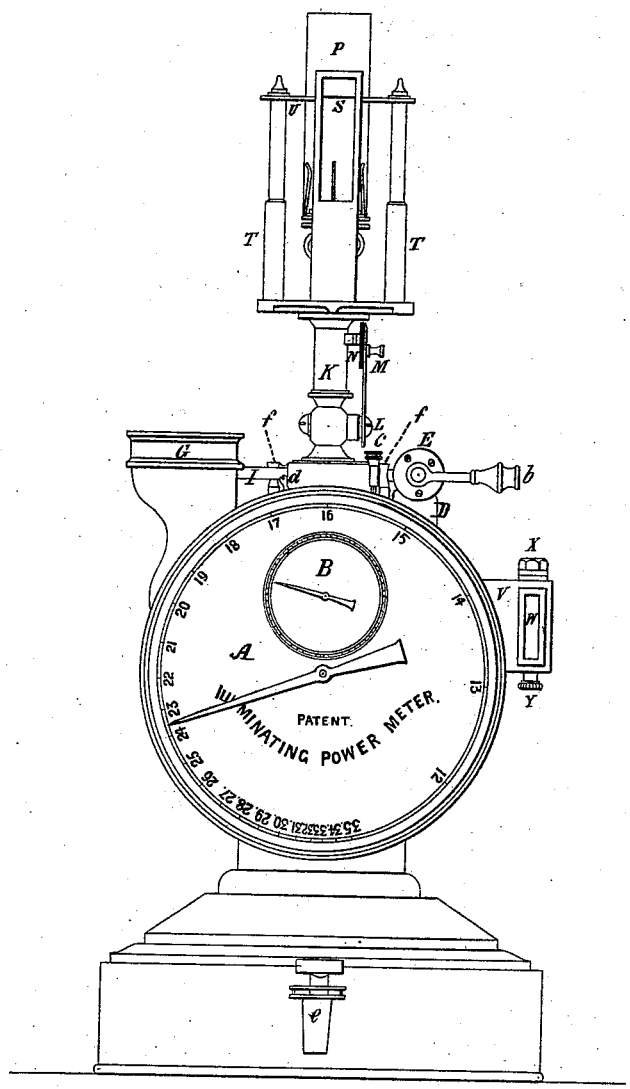

W. T. SUGG.
APPARATUS FOR INDICATING THE ILLUMINATING POWER OF GAS.

No. 184,673.  Patented Nov. 21, 1876.

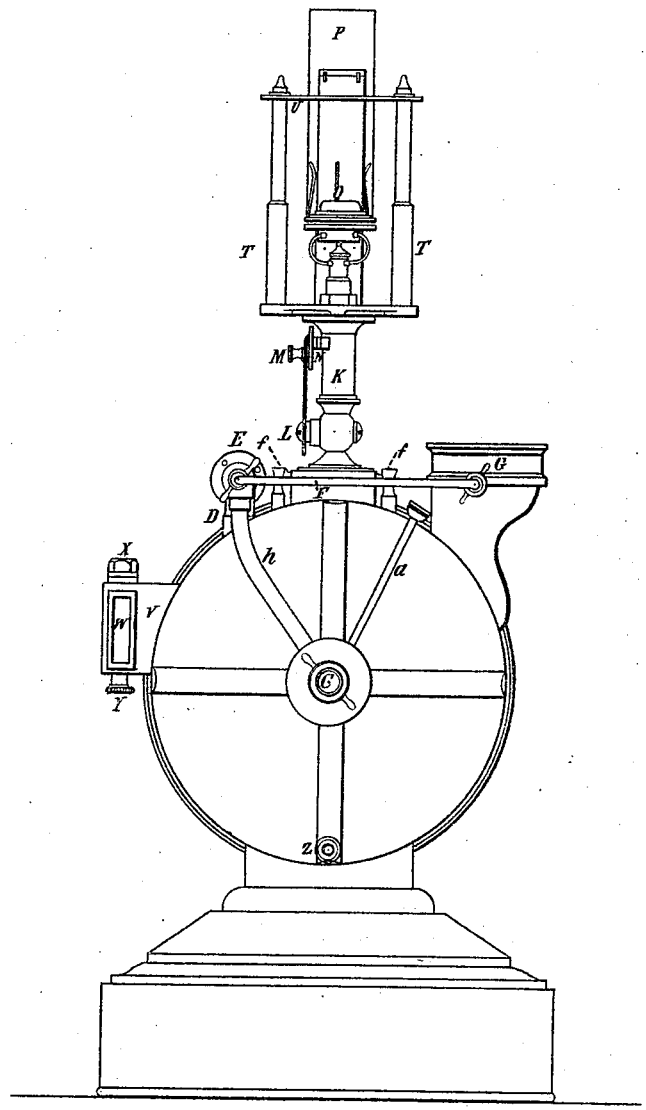

W. T. SUGG.
APPARATUS FOR INDICATING THE ILLUMINATING POWER OF GAS.
No. 184,673.  Patented Nov. 21, 1876.
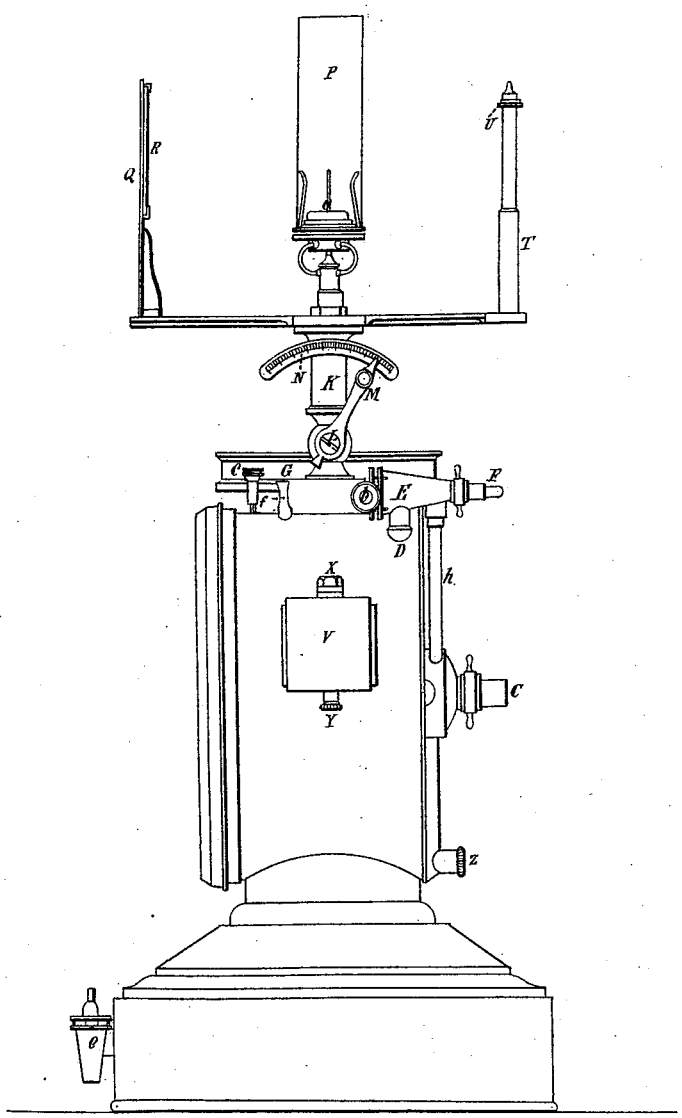

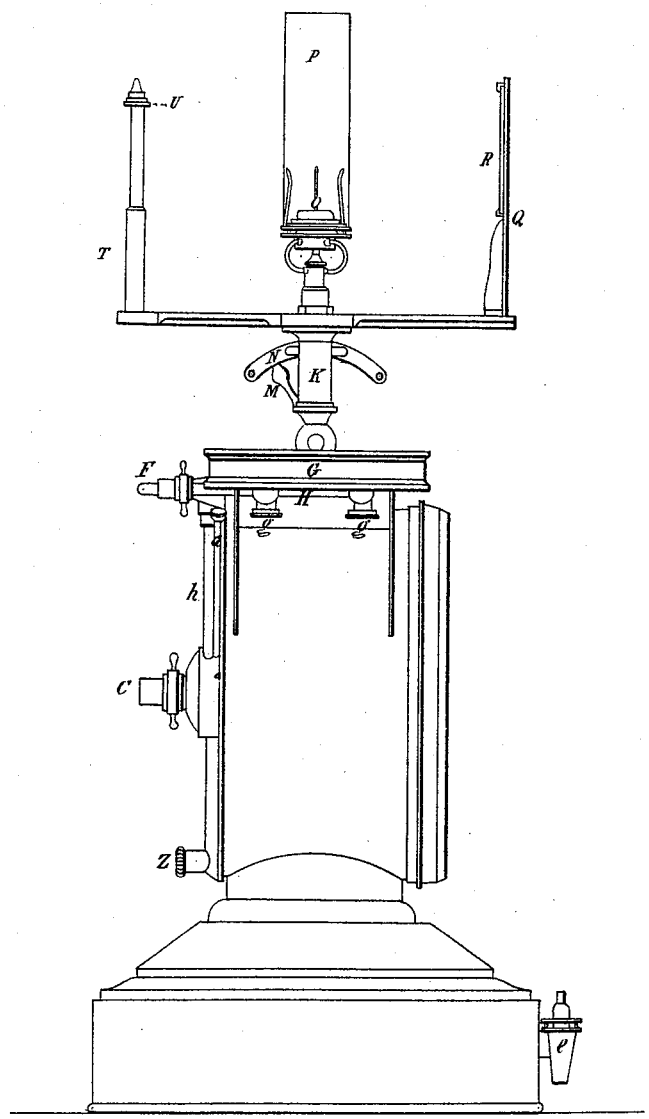

UNITED STATES PATENT OFFICE.

WILLIAM T. SUGG, OF WESTMINSTER, ENGLAND.

IMPROVEMENT IN APPARATUS FOR INDICATING THE ILLUMINATING POWER OF GAS.

Specification forming part of Letters Patent No. 184,673, dated November 21, 1876; application filed May 15, 1876.

*To all whom it may concern:*

Be it known that I, WILLIAM THOMAS SUGG, of Vincent Works, Vincent Street, in the city of Westminster, England, have invented an Improved Apparatus for Indicating the Illuminating Power of Gas, of which the following is a specification:

This invention has for its object the more ready means of determining the illuminating power of gas, and is based upon the idea that to maintain from an Argand burner a flame three inches high a quantity of gas proportionate to its quality will be consumed within a given time.

The invention consists of a meter made somewhat like an ordinary experimental meter, fitted at the top with a standard to support an Argand burner, and a frame or frames with horizontal wires and colored-glass plate attached, to which the height of the flame is adjusted by means of a cock having a pointer and a quadrant or divided arc fixed to the standard. The plug of the cock, instead of having a round hole, has a slitted opening, so that when the cock is turned the free way for the gas shall be at all times increased or diminished in the same proportion as the pointer or handle is turned. The meter has also fixed to it two dry governors or regulators, connected together, so that the pressure of the gas, by passing through both, may be maintained with greater exactitude. At the bottom of the case, immediately under each governor, there may be a plug to draw off any condensation that may be deposited; or a pipe or pipes may descend therefrom into and below the surface of the water in the meter. The apparatus is also furnished with a pipe or pipes and a by-pass or three-way cock, so that gas may be conducted from the supply-pipe, through the governors, to the burner; or by turning this cock the gas supplied to the burner may be compelled to pass through the meter as well as both governors before reaching the point of combustion. The meter has also a clock within it, with a hand that makes one revolution per minute.

In order that the foregoing may be more easily understood, drawings are attached hereto, of which the following is a description:

Figure 1 is a front elevation. Fig. 2 is a back elevation. Fig. 3 is a right-side elevation, and Fig. 4 is a left-side elevation.

In Fig. 1, A is the gas-dial, and B the clock-dial, both in front of the general body of the meter. In Fig. 2, C is the inlet for the gas, and D the pipe for conveying it to the by-pass valve E. (Shown more distinctly in Fig. 3.) From this by-pass the gas flows through the pipe F to the first of two dry governors contained in box G. From the first governor the gas is conveyed by the pipe H to the second governor, from whence it travels by the pipe I to the standard K. L is the adjustment-cock before mentioned, with its handle and pointer M, which passes over a graduated arc, N. From this cock the gas ascends to the burner O, the chimney being marked P. Q is a small upright frame, carrying a plate of colored glass, R, and having a line marked upon it at S. T T are two pillars, carrying a wire or light brass bar, U, which is placed at exactly the same height as the mark S upon the glass plate. V is a box, with a piece of glass, W, both at back and front, and has a mark upon it denoting the exact water-level. X is the filling-plug, and Y the water-adjustment plug. Z is also a draw-off plug for any condensation or liquid that may enter the spout. $a$ is a pipe for conveying oil to the bearings. $b$ is the handle of the by-pass valve E, and is shown as situated when the gas is off the meter in Fig. 1, and as on or through the meter in Fig. 2. $c$ is the clock-key, and $d$, Fig. 1, is the stop to the clock. $e$ is a tap for running off the whole of the liquid from the meter. $f f$ are pillars, whereon may be placed a spirit-level for leveling the meter with accuracy, and $g g$ are screw-plugs, from which any condensation deposited in the governors may be drawn off.

Similar letters refer to the same parts in each of the figures.

The mode of using the apparatus is as follows: Gas is allowed to flow from the inlet C, through the tube $h$, to the by-pass E, and from thence, through the pipe F and governors in G, along the tube I to the standard K, when the gas is lighted. The cock is then adjusted by the handle M, until, on looking through the glass plate R, the top of the flame is seen to be on a level with the mark on the glass and the bar U. During this part of the operation the handle $b$ of the by-pass E will be in the position shown in Fig. 1, and gas will flow from the inlet to the governors and burner without passing through the drum of the meter. The handle $b$ is now to be turned, as depicted in Fig. 2, when the gas will flow through the drum of the meter before arriving at the governors and burner. The gas-hand is then allowed to revolve until it stands vertically and at zero, when the handle $b$ is to be shut down again, as in Fig. 1. The position of the clock-hand is now to be noted, and at the same time the handle of the by-pass is to be raised, as in Fig. 2. On the clock-hand making a complete revolution, the handle of the by-pass is to be shut down, as in Fig. 1, when the gas-hand will become stationary, and point to the number of standard sperm-candles (being six to the pound, and consuming one hundred and twenty grains of sperm per hour) the gas is equal to when burning at the rate of five cubic feet per hour.

I claim as my invention—

1. In the apparatus for indicating the illuminating power of gas described, the by-pass E, provided with a handle, $b$, constructed and operating as and for the purposes described.

2. In the described apparatus for indicating the illuminating power of gas, the by-pass E, governors G, and standard K, connected by tubes and combined together, as described.

3. In the described apparatus for indicating the illuminating power of gas, the adjustment-cock L, provided with a pointer, M, the standard K, the burner O, the marked glass R, and the bar U, supported upon pillars T T, as and for the purposes described.

WILLIAM T. SUGG.

Witnesses:
  W. H. BENNETT,
  CHAS. V. BENNETT.